Jan. 9, 1968 R. J. MULLER 3,362,280
PUSH-ON MOLDED PLASTIC CAP-FASTENER
Filed June 7, 1966 2 Sheets-Sheet 2
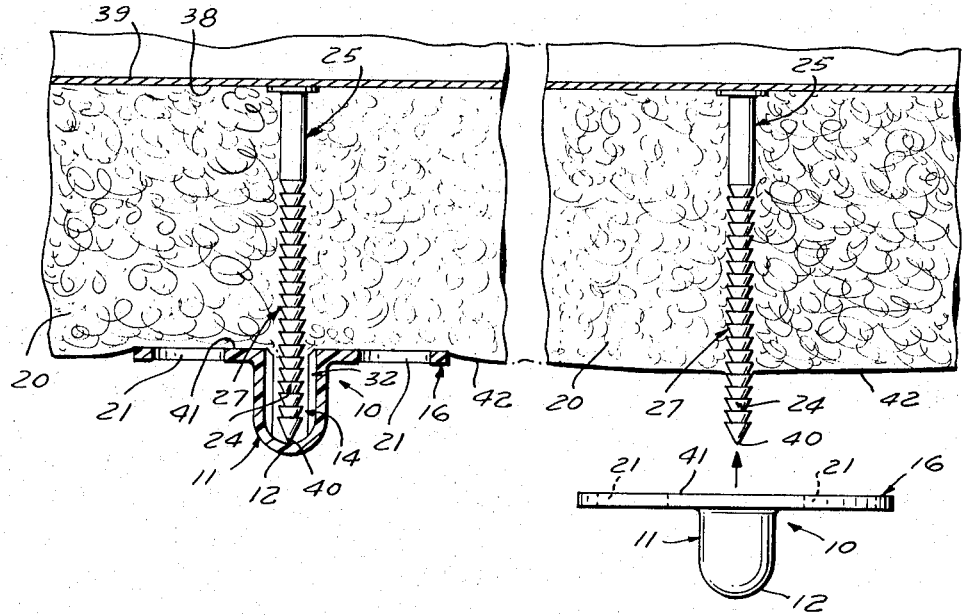
FIG. 6
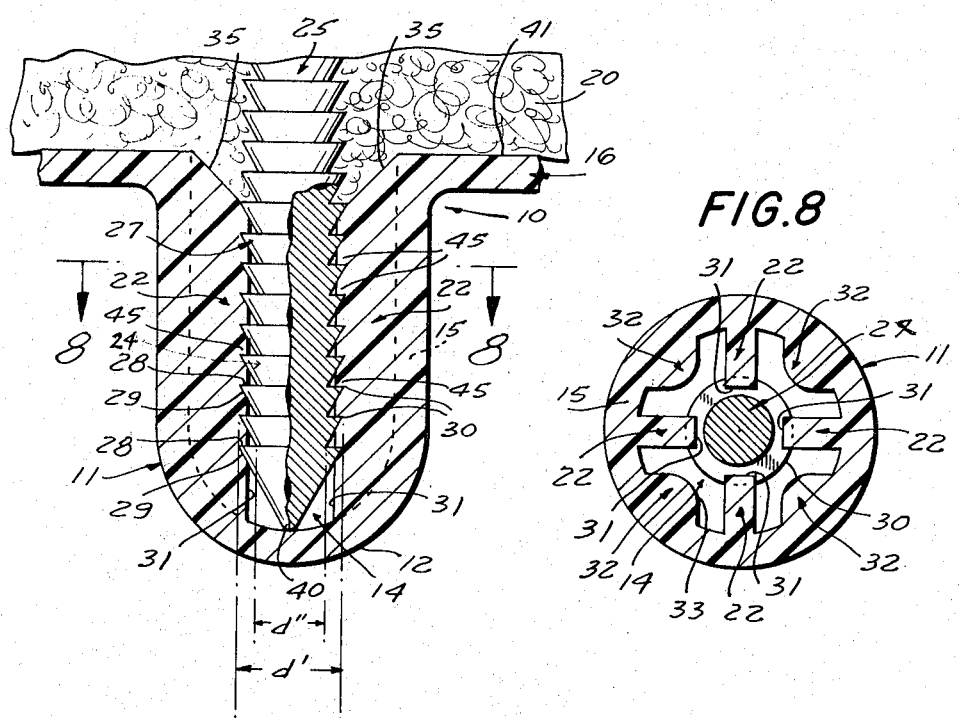
FIG. 7
FIG. 8

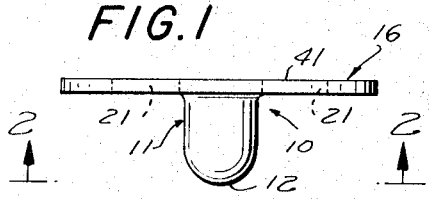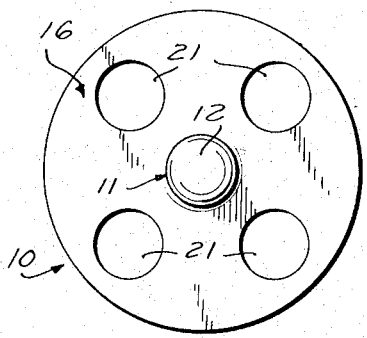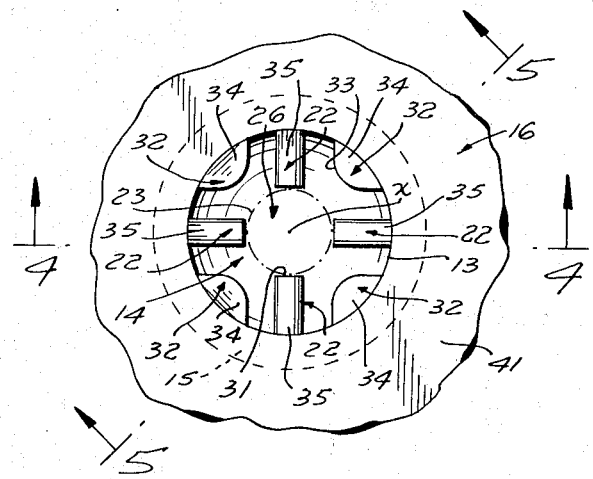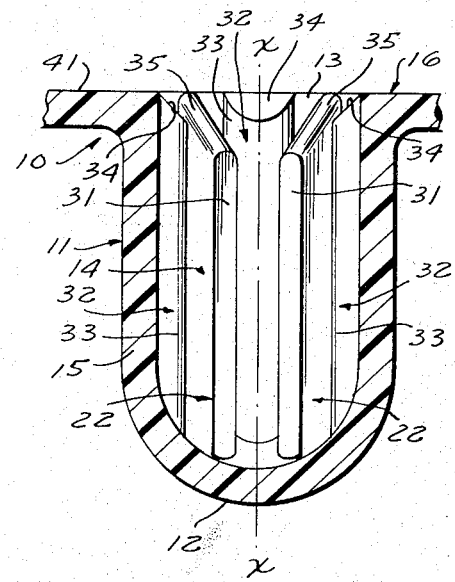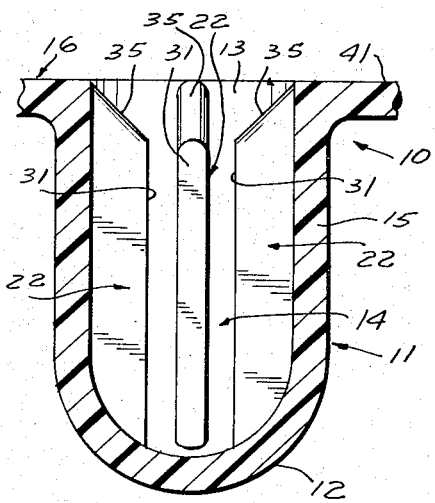

United States Patent Office 3,362,280
Patented Jan. 9, 1968

3,362,280
PUSH-ON MOLDED PLASTIC CAP-FASTENER
Robert J. Muller, Port Chester, N.Y., assignor to Russell, Burdsall & Ward Bolt and Nut Company, Port Chester, N.Y., a corporation of New York
Filed June 7, 1966, Ser. No. 555,833
3 Claims. (Cl. 85—35)

ABSTRACT OF THE DISCLOSURE

A push-on molded plastic cap fastener for pushing over the end of a protruding stud, such as a nail, having a cylindrical hollow socket chamber closed at its outer end and open at its inner end and an annular flange extending outwardly from the open inner end of the socket chamber; the socket chamber having inwardly extending wings which grip the shank of the protruding stud when it is inserted into the socket chamber.

---

This invention relates generally to cap fasteners and more particularly to fasteners having an open end socket portion into which is inserted a male part, the fastener having an annular flat ring portion extending outwardly from the open end of the socket in a plane at right angle to the axis of the socket.

Cap fasteners made according to the invention are admirably suited for fastening compressible insulation batts to sheet metal conduits; especially conduits through which cooled or warmed air is passed; for example conduits and passageways in air conditioning or circulating air heating or cooling systems. Other uses for the cap fastener will suggest themselves from the more detailed description of the fastener which follows later on.

In air conditioning systems, for example, cooled air is circulated through conduits which usually are constructed of sheet metal. It has been common practice to insulate the conduits by fastening a layer of insulation material to the surface, or surfaces, of the sheet metal conduits. One type of insulation material extensively used presently is fiberglass in the form of a batting of loosely felted fibers, commonly referred to as batts. The batts of fiberglass insulation are impaled on sharp pointed studs welded to, or otherwise secured to, the sheet metal. The sharp pointed studs may be in the form of nails or pins. These extend outwardly and substantially perpendicular to the surface of the sheet metal. Ordinarily these studs, in the form of nails or pins, are spaced apart, four to six inches from each other. After the studs are secured to the sheet metal, the batts of insulation are pressed toward the sheet metal with the sharp studs passing through it, so that their sharp end portions extend beyond the outer surface of the batts. Thus, the batts are impaled on the outwardly extending studs. Then a fastener is placed on each of the exposed portions of the sharp pointed studs to secure the batts in position against the sheet metal and to hold the insulation in place.

There are numerous prior patents disclosing fasteners for installation over the exposed portions of the impaling studs for holding the insulation batts on the surface of sheet metal conduits. Most of them disclose fasteners made of sheet metal which are provided with tongues, wings, or prongs of spring steel which permit the fastener to pass over the exposed shank of a stud and the ends of the tongues grip or pinch the stud. Those fasteners of the metal spring-tongue type are usually of a kind that provides no protective covering over the sharp pointed studs. And since the placing of these fasteners on the studs is done by hand and the work must be done speedily, the workmen's hands are frequently pierced or scratched by the sharp pointed studs and such injuries are sometimes of a serious nature. Furthermore, metal fasteners have other drawbacks, in that cooled air passing through the metal duct cools the protruding metal studs and the fasteners. The metal is a good heat conductor. Hence, the fasteners are often cooled sufficiently to cause moisture in the ambient atmosphere surrounding the duct to condense on the cooler metal and sometimes water drips from the stud or fastener. This is objectionable, particularly when the ducts are located over a ceiling, as is often the case. The drip will find its way to the ceiling below the conduit and manifestly this will cause damage; especially when the moisture condensed on the metal fasteners causes them in time to become rusty. Then the drip will discolor the plaster or other water absorbent ceiling material.

Also, there are prior patents which disclose crown type fasteners made of rubber or plastic material, which may be used to cover the exposed end of a threaded bolt on which a threaded nut has been wrenched, but these do not have suitable means for gripping on small shanked, pointed studs for holding an insulation batt on the surface of a sheet metal conduit, and there has been no provision of a lateral flange providing sufficient bearing surface for supporting loosely felted fiberglass insulation material.

Self-tapping plastic crown-type fasteners are available for screwing on to a helix threaded screw, the fastener making its own thread as it is turned on the screw. This is very time consuming. There is also disclosed in the prior art, certain push-on crown covers to protect against sharp pointed sheet metal screws, but there is no provision for a bearing surface sufficient to hold up loosely felted batts of fiberglass insulation.

It is an object of this invention to provide a push-on molded plastic cap fastener which overcomes the drawbacks of the prior art fasteners and which, inter alia, is admirably suited for fastening insulation batts of compressible material, such as fiberglass insulation, to sheet metal ducts or the like.

Summary of invention

In accordance with the invention, a one-piece push-on molded plastic cap fastener is provided which comprises a hollow tubular crown portion closed at its outer end and open at its inner end, and having a throat portion at its open inner end and a vertically disposed wall defining a socket portion to receive the end portion of a stud; a flat annular flange of substantial area extending laterally outwardly from the upper open end portion of the crown portion sufficient to provide ample bearing area to support and hold up a layer of loosely felted fiberglass insulation material; a plurality of spaced, vertically axially disposed, gripping wing portions extending radially inward from the wall portion toward the central axis of the socket and terminating short of the axis to provide a central opening into which the outer end portion of the stud is inserted with the axially extending edges of the wings in gripping engagement with the shank of the stud; and axially extending, reinforcing guide bosses between adjacent gripping wings extending inwardly from said wall toward the central axis of the socket and terminating short of the central opening provided by the inner axially extending edges of said gripping wing portions.

Although the novel features which are believed to be characteristic of the invention are pointed out in the annexed claims, the invention itself as to its objects and advantages, and the manner in which it may be carried out may be better understood by reference to the following more detailed description taken in connection with the accompanying drawings forming a part hereof, in which:

FIG. 1 is a view in elevation of the cap-fastener embodying the invention;

3,362,280

3

FIG. 2 is a view in plan on line 2—2 of FIG. 1 looking at bottom of the fastener;

FIG. 3 is a fragmentary plan view to larger scale looking from the top of the fastener;

FIG. 4 is a sectional view in elevation on line 4—4 of FIG. 3;

FIG. 5 is a sectional view in elevation on line 5—5 of FIG. 3;

FIG. 6 is a sectional view in elevation, illustrating, at the left, the cap-fastener installed on a stud which is secured to the sheet metal conduit with the fiberglass insulation in place and, at the right, illustrating the stud and insulation prior to installing the fastener on the protruding end portion of the stud;

FIG. 7 is a fragmentary view in elevation to larger scale to illustrate the manner of locking the inner edge portion of the gripping wings into grooves of the stud; and FIG. 8 is a view on line 8—8 of FIG. 7.

Referring now to the drawings, in which like reference characters indicate like parts throughout the several views, the fastener 10 is a one piece device molded from plastic such as a nylon resin or other similar moldable plastic having toughness, abrasion resistance, and one which will stand up without substantial change in its characteristics at the high or at the low temperatures to which the metal ducts in air conditioning or heating systems are exposed. A plastic nylon resin known in the trade and sold under the trademark Zytel has been found to be particularly well suited for the manufacture of the fasteners.

As shown, the fastener 10 comprises a tubular portion 11 (herein sometimes referred to as a crown portion), which is closed by a rounded end portion 12, the opposite end being open and providing an open throat 13. For convenience of description, the device is described as to top and bottom and as to vertical direction with reference to the figures as viewed in the drawings, wherein the tubular portion 11 is shown in vertical position, but it will be understood that another frame of reference might be adopted. The vertically disposed tubular portion 11 has a vertically and axially disposed side wall portion 15, preferably of generally cylindrical shape, defining a socket chamber 14 into which the end of a stud may be inserted up to the place at which the end of the stud contacts the inner surface of the bottom end closure wall 12, but no further.

Extending laterally from the upper end portion of the tubular crown portion 11 and at right angle to the central axis x—x of the socket chamber 14 is a flat bearing flange 16, preferably circular in shape. The annular top area 41 of the flange around the throat 13 of the fastener is sufficiently large to provide ample bearing area to hold up the loosely felted fiberglass insulation 20 (see FIG. 6) without any substantial compressing of the thickness of the insulation. Any compression of the fiberglass insulation which causes a substantial reduction of the thickness of the insulation, reduces its efficiency as an insulator. The holes 21 are primarily to save plastic material and do not serve any particular function, but should not be so large as to unduly weaken the flange so that it will not serve its function as a bearing surface for the insulation.

Extending inwardly from the interior surface of the cylindrical wall 15 of the tubular crown portion 11 are a plurality of circumferentially, equally spaced gripping wings 22. These gripping wings are made of a thickness sufficient to give rigidity to the wings, yet they are sufficiently flexible and resilient that the axially extending, inner edges 31 will permit insertion of the stud and they press against and pinch the stud shank when the stud is inserted into the socket chamber 14. The inwardly and radially extending flat wings 22 terminate short of the axis x—x of the socket chamber, thus providing an axial extending central opening having a diameter of an imaginary circle indicated by broken lines 23 (see FIG. 3). This circle is of a diameter slightly less than the major

4 diameter $d'$ of the shank portion 24 of the stud 25 that is to be inserted in the socket of the fastener (see FIG. 7). The minor diameter $d''$ of the grooved portion 24 of the shank is slightly less than the diameter of circle 23 which defines the central opening 26 which receives the stud. Studs, in the form of nails having grooved shanks and pointed ends, as shown, are available and are preferred for use with the fastener illustrated, although other types of studs without ridges may in some instances serve, in lieu of grooved studs. The studs may be welded to the sheet metal 38 in known manner by a known type of weld gun.

It will be observed that the grooved shank 24 (see FIG. 7) comprises ridges and valleys. The upper flanks 28 of the ridges 27 lie in planes substantially at right angles to the long axis of the stud and the lower flanks 29 are inclined downwardly from the crests 30 of the ridges. The upper flanks, as shown, lie in parallel planes, and thus the ridges are not in helix thread form; although such a threaded shank could be used.

Guide means are provided in the socket so that upon installing the fastener on the protruding end of the stud, the fastener is self-centering to make certain that the shank of the stud will be engaged along the entire axial lengths of the inner edges 31 of the gripping wings; thus to obtain maximum locking engagement. The guide means are in the form of inwardly extending guide bosses 32 which also serve to reinforce the tubular side wall 15 of the crown 11. There is a guide boss 32 positioned between each adjacent pair of gripping wings 22, each having a curved surface 33, the innermost part of which has a radial length less than the radial length of the gripping wings. The guide bosses have downwardly extending, inclined upper end surfaces 34 and the upper end edges of the wings 22 have inclined surfaces 35. Thus, these inclined surfaces 34, 35 form, in effect, an upwardly and outwardly flared throat. An advantage of this arrangement is that it provides a hole of large area for installation of the fastener over the protruding pointed stud, so that a workman can speedily install the fastener without manipulating the fastener to absolute centered position when stabbing the stud into the socket. And regardless of the position of the point, so long as the point is within the area of the flared throat, the fastener will center itself when it is pushed on to the protruding shank portion 24 of the stud. The closed crown 11 prevents the point 40 of the stud from piercing or scratching the workman's hand or fingers when he pushes the fastener into installed position on the stud.

The length of the stud shank is selected so that after the insulation batt 20 is placed into position with its inner surface 38 (see FIG. 6) engaging the surface of the sheet metal 39, the length of shank that protrudes from the lower surface 42 of the insulation layer 20 corresponds to the depth of the socket chamber 14 so that when the point 40 of the stud engages the bottom wall 12 of the crown cap portion 11, the upper surface 41 of the laterally extending flange 16 engages the bottom surface 42 of the insulation. Hence, the fastener cannot unduly compress the loosely felted insulation layer 20, and it will hold the insulation in its proper place.

Reference is now made to FIGS. 7 and 8. It will be observed that when the fastener 10 is pushed on to the protruding shank 24, the crests 30 of the ridges become imbedded in the inner edge portions 31 of the gripping wings 22 all along the axial length of the wings; the plastic having such characteristics of resiliency that small teeth 45 of plastic extend into the grooves along the length of the shank, and the annular ridges 27 of the stud serve, in effect, as barbs which lock the fastener onto the stud so that resistance to the removal of the fastener, once it has been installed on the stud, is so great as to require unusual effort and force to remove or pry off the fastener. Furthermore, the plastic fastener is a poor heat conductor and, notwithstanding that the metal studs may be cooled or heated by air flowing through the duct, moisture does not condense on the fastener to form an unwanted drip.

The fastener may be made in various sizes. The size, as shown, in the drawings for illustrative purpose has been found to be very satisfactory. As shown, the diameter of the flange 16 is 1 3/16″ and the flange has a thickness of .035″. The depth of the crown from the top surface 41 of the flange to the bottom surface of the end wall 12 is .375″, and the tubular crown portion has an outside diameter of .250″. The angle of the top end surfaces 35 of the wings 22 with the axis x—x of the crown is 45° and the diameter of the imaginary circle 23 defining the central opening provided by the inner edges 31 of the wings is .085″ to accommodate a grooved stud having a major diameter $d'$ of .089″–.091″. The thickness of the wings is .020″. The surfaces 33 of the guide bosses 32 are curved to a radius of 1/32″ and their upper end surfaces 34 are inclined 45° to the central axis x—x. Of course, it will be understood that tolerances within the usual custom and practice of injection plastic molding are permissible.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A single piece molded synthetic plastic push-on crown fastener for installation on the end portion of the shank of a stud which comprises a hollow tubular crown portion closed at its outer end and open at its opposite inner end and having a throat portion at said inner end and a vertically disposed wall portion defining a socket chamber to receive the said end portion of the shank of the stud; an annular flange portion extending laterally and outwardly from the open end portion of said crown portion, said flange having an annular top surface bearing area; a plurality of circumferentially and substantially equally spaced, vertically and axially disposed gripping wing portions extending radially inward from said wall portion toward the central axis of the socket chamber, the inner axially disposed edges of said wings terminating short of said axis to provide a central opening into which the outer end portion of the shank of said stud may be inserted with the axially extending inner edges of the wings in gripping engagement with said shank end portion of the stud; and a plurality of axially extending, reinforcing guide bosses substantially midway between each pair of adjacent gripping wing portions and extending radially inwardly from said wall a substantial distance toward the central axis of said socket chamber but terminating short of the said central opening provided by the inner axially extending edges of said gripping wing portions, each of said wings and said bosses extending throughout substantially the entire axial extent of the socket chamber with the portion thereof adjacent the open inner end being beveled from a locus substantially coincident with the periphery of the central opening radially outwardly and upwardly in the direction of the open inner end.

2. A push-on crown fastener as defined in claim 1 for use on a stud having a grooved shank whose major diameter is greater in diameter than the diameter of said central opening, in which the inner axially extending edge portions of said gripping wing portions are distorted by the crests of the grooves of the grooved shank having a major diameter slightly greater than the diameter of said central opening to form locking teeth in said grooves to lock said fastener onto said grooved shank when said grooved shank is inserted into said central opening and said fastener is pushed on to said shank.

3. A one-piece molded plastic push-on crown fastener for installation onto the protruding end portion of the grooved shank of a stud secured to a sheet metal air duct on which is impaled a layer of loosely felted fiberglass insulation positioned against said sheet metal which fastener comprises a vertically disposed hollow tubular wall portion of generally cylindrical shape closed by a rounded wall at its bottom end and open at its upper end providing a socket chamber having a throat at its upper end; an annular flange extending laterally from the upper end portion of said tubular wall having a bearing area of sufficient area to hold up said layer of insulation when said fastener is pushed-on to said stud, four gripping wings spaced 90″ apart in said socket chamber extending radially inwardly from the inner surface of said tubular wall, said wings extending axially from said open end to the closed bottom end of said tubular portion and the inner vertical edges of said radially disposed wings terminating short of the vertical central axis of said tubular portion and providing a central opening having a diameter less than the major diameter of the grooved shank of said stud into which said shank may be inserted through said throat into locking engagement with said vertical edges of said gripping wings; and guide bosses each having a substantial axial length and extending radially inward from the inner surface of said tubular wall, positioned between said wings and terminating short of the central opening provided by the inner vertical edges of said wings, the upper ends of said wings and bosses being inclined downwardly and inwardly from a locus coincident with the open upper end of said vertically disposed tubular wall portion and forming a flared throat at the entrance into said socket chamber for centering the said protruding end portion of said shank in said socket chamber.

References Cited

UNITED STATES PATENTS

| | | | |
|---|---|---|---|
| 1,751,818 | 3/1930 | Karitzky | 85—84 |
| 1,754,333 | 4/1930 | Pleister et al. | 85—84 |
| 2,310,756 | 2/1943 | Tinnerman | 85—36 |
| 2,933,794 | 4/1960 | Biesecker | 85—32 |
| 3,280,875 | 10/1966 | Fischer | 85—83 |

FOREIGN PATENTS 560,705   4/1957   Italy.

CARL W. TOMLIN, *Primary Examiner.*

R. S. BRITTS, *Assistant Examiner.*